April 7, 1936.   W. LYONS   2,036,343
ELECTRIC TRANSMISSION CIRCUIT
Filed May 8, 1935
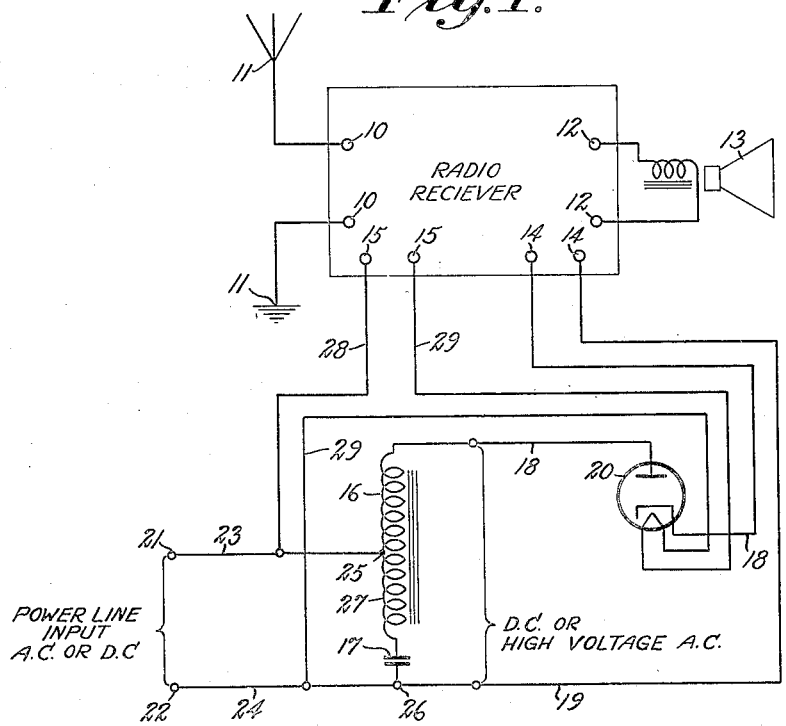
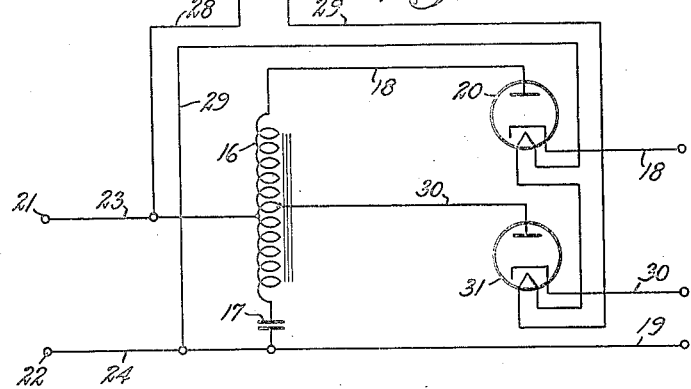
INVENTOR.
WALTER LYONS
BY Lawrence B Dodds
ATTORNEY.

Patented Apr. 7, 1936

2,036,343

UNITED STATES PATENT OFFICE 2,036,343

ELECTRIC TRANSMISSION CIRCUIT

Walter Lyons, Flushing, N. Y., assignor to Hazeltine Corporation, a corporation of Delaware Application May 8, 1935, Serial No. 20,334

9 Claims. (Cl. 250—27)

This invention relates to electric transmission circuits, and particularly to circuit arrangements for connecting with a power line, carrying either direct or alternating current, apparatus adapted to use either of such currents.

In radio receivers designed to operate on either direct current or alternating current, a single input circuit is usually employed for connecting the receiver with a power line carrying either direct current or alternating current. It is highly desirable that this connection may be made without the necessity of adjustment or switching of the circuit regardless of which type of current is used and when alternating current is supplied by the power line, it will be delivered, for use in the receiver, at a predetermined step-up voltage ratio.

An object, therefore, of this invention is to provide an improved circuit arrangement whereby a radio receiver or other apparatus, which may be operated by either direct or alternating current, can be connected with a power line carrying either direct or alternating current without the necessity of adjustment or switching of the circuit.

A further object is to provide a circuit arrangement of the character described, by which the alternating current will be delivered at a step-up voltage ratio.

A further object is to provide a circuit arrangement of the character described by which a part of the alternating current will be delivered at a step-up voltage ratio and a part at the voltage of the supplied current.

Other and further objects of, and advantages achieved by, this invention will be apparent from the following description of approved embodiments thereof.

In accordance with one embodiment of the present invention, the interconnection between the supply circuit and the radio receiver apparatus or similar load circuit comprises essentially a transformer having primary and secondary windings connected with the supply circuit and the load circuit, respectively, and impedance means connected in series with both transformer windings and having a high impedance to direct current and a low impedance to alternating current. The supply and load circuits preferably have one common terminal while their other terminals are interconnected by a direct current path through the transformer windings. A rectifier may be provided in the output current path between the transformer and the load circuit.

More specifically, in a preferred form of the present invention, the connecting circuit arrangement comprises a transformer winding connected in series with a direct current blocking condenser across the output conductors of the circuit. One input terminal is connected to an intermediate tap of the transformer winding and the other input terminal is connected to the terminal of the condenser remote from the transformer, constituting a common input-output terminal. In such an arrangement, the transformer winding constitutes an auto-transformer, the part between the tap and the condenser being the primary winding and the entire coil being the secondary winding of the transformer. The blocking condenser prevents the passage of direct current through the primary winding which, because of its low resistance, would otherwise draw a heavy direct current. The condenser passes alternating current, however, so that when such current is being supplied, the auto-transformer operates in a conventional manner to supply alternating current at a step-up voltage ratio to the output terminals. A rectifier is interposed in the output conductor which is connected to the end of the transformer winding remote from the condenser.

In another embodiment of the invention there is provided, in an arrangement substantially similar to that above described, an additional output conductor having a separate rectifier interposed therein. This conductor is connected to an intermediate tap of the transformer winding so that a part of the total current will be supplied at a lower voltage which may be approximately equal to the supply voltage.

In the accompanying drawing, Fig. 1 is a circuit diagram of the present invention as applied to the interconnection of a radio receiver with a supply circuit carrying either direct or alternating current, and Fig. 2 is a circuit diagram of a modified form of the invention.

Referring particularly to Fig. 1, there is shown diagrammatically a radio receiver having signal receiving input terminals 10—10 connected to an antenna-ground circuit 11—11, and output terminals 12—12 connected with a loud-speaker 13. The radio receiver is provided with main power input terminals 14—14, and cathode-heater input terminals 15—15.

The interconnecting circuit arrangement embodying the present invention comprises a transformer winding 16 of the iron core type connected in series with a direct current blocking condenser 17 across output conductors 18 and 19, which are connected to the terminals 14—14 of the receiver. A rectifier 20 is included in series in the conductor 18. The rectifier 20 may be of any of the several well known types, though I have shown, by way of example, a vacuum tube rectifier of the diode type. In the output circuit of the rectifier, which includes the terminals 14—14, suitable filters of conventional type will be included in the usual manner. A pair of input terminals 21 and 22, which are adapted for connection by a suitable plug or jack (not shown) with a power line or supply circuit carrying either direct or alternating current, are connected by conductors 23 and 24, respectively, to an intermediate tap 25 of the transformer winding 16 and the side of the condenser 17 remote from the transformer winding as indicated at 26. The terminal 26 thus constitutes a common input and output terminal. Conductors 28 and 29 connect the conductors 23 and 24, respectively, with the cathode heater terminals 15—15 of the receiver. The cathode heater of the rectifier 20 is serially connected in the conductor 29.

The transformer winding 16, as thus connected, constitutes an auto-transformer, the portion between the tap 25 and the condenser 17, indicated at 27, forming the primary winding and the entire coil forming the secondary winding. The number of turns of the primary winding are so proportioned relative to the number of turns of the secondary winding, or entire coil, as to provide the desired step-up voltage ratio when alternating current is being supplied. The condenser 17 is so proportioned that its alternating current impedance is small relative to the impedance of the primary winding of the transformer at the operating frequency and its impedance to direct current is substantially infinite.

It will be apparent that in the use of the embodiment of the invention just described, when the input terminals 21 and 22 are connected with a supply circuit carrying direct current, the passage of such current through the primary winding 27 is blocked by the condenser 17 and the direct current will flow to the conductors 18 and 19 without undue interference from the transformer. The rectifier will permit free passage of the direct current therethrough to the receiver. When, however, the input terminals are connected with a supply circuit carrying alternating current, the condenser 17 will pass such current and it will flow through the primary winding 27. An alternating current will be induced thereby in the secondary winding, with a step-up voltage ratio and this current will be supplied to the conductors 18—19. The rectifier will function in the well known manner to convert the alternating current to direct current, which is delivered to the receiver.

A modified form of the invention is shown in Fig. 2, wherein corresponding elements are indicated by the same reference numerals as in the system of Fig. 1. In this embodiment, an additional output conductor 30 is connected to an intermediate tap on the transformer and a separate additional rectifier 31 (similar to the rectifier 20) is serially connected in the conductor 30. The cathode heater of the rectifier 31 is serially connected in the conductor 29 in the same manner as the filament of the rectifier 20. While the receiver proper is not indicated in Fig. 2 it will be understood that the terminals 21—22 and the conductors 18—19 and 28—29 are connected substantially in the same manner as described with reference to Fig. 1. In this case, however, the conductors 18 and 19 are preferably connected only to the power tubes of the receiver while the lower voltage conductors 30 and 19 are connected with the receiver amplifier tubes. This condition is, of course, desirable in that the power tubes normally operate at higher voltages than the amplifier tubes.

Further, when direct current is being supplied, the portion thereof delivered to the amplifier tubes will not pass through the upper part of the transformer and, therefore, only a part of the total current will be subject to the voltage drop across this part of the transformer. Hence a greater total amount of output voltage will be available.

It will thus be apparent that this invention provides simple and efficient circuit arrangements by which a radio receiver or any other similar apparatus designed for using either direct or alternating current may be connected with a power line carrying either kind of current, without the necessity of adjustment or switching and by which either all or a part of the current can be delivered at a step-up voltage ratio when alternating current is supplied.

While certain embodiments of this invention, which are considered at present to be the preferred embodiments thereof, have been hereinbefore described, it will be obvious to those skilled in the art that various changes and modifications may be made without departing from the spirit of the invention and the appended claims are, therefore, intended to cover all such changes and modifications as fall within the scope of this invention.

What is claimed is:

1. An electric circuit for transmitting direct current without appreciable attenuation and alternating current at a step-up voltage ratio, comprising a transformer having a primary winding for connection with a supply circuit carrying either direct current or alternating current and a secondary winding for connection with a load circuit, impedance means connected in series with both said windings and having a high impedance to direct current and a low impedance to alternating current, a common terminal at one side of said impedance for said supply and load circuits, and a direct current path through said transformer for interconnecting said circuits for the transmission of said direct current, the elements of said transmission circuit being proportioned and arranged to deliver said alternating current to said load circuit at a predetermined step-up voltage ratio.

2. An electric circuit for transmitting direct current without appreciable attenuation and alternating current at a step-up voltage ratio, comprising a pair of input terminals for connection to a source of direct current or alternating current, a pair of output terminals for connection with apparatus adapted for using either direct or alternating current, a transformer including a primary winding having a terminal connected to an input terminal and a secondary winding having a terminal connected to an output terminal, said windings having a common terminal, and impedance means having a high impedance to direct current and a low impedance to alternating current interconnecting said common terminal and the other input and output terminals, the elements of said circuit being proportioned and arranged to deliver said alternating current to said output terminals at a predetermined step-up voltage ratio.

3. An electric circuit for transmitting direct current without appreciable attenuation and alternating current at a step-up voltage ratio, comprising a pair of input terminals for connection to a source of direct current or alternating current, a pair of output terminals for connection with apparatus adapted for using either direct or alternating current, a transformer including a primary winding having a terminal connected to an input terminal and a secondary winding having a terminal connected to an output terminal, and a condenser having a high impedance to direct current and a low impedance to alternating current interconnecting the other terminals of said windings and the other input and output terminals, the elements of said circuit being proportioned and arranged to deliver said alternating current to said output terminals at a predetermined step-up voltage ratio.

4. An electric circuit for transmitting direct current without appreciable attenuation and alternating current at a step-up voltage ratio, comprising input terminals for connection with a source of direct current or alternating current, output terminals for connection with apparatus adapted to use either direct or alternating current, a transformer including a primary winding connected for receiving alternating current from said input terminals when alternating current is supplied thereto and a secondary winding for delivering alternating current to said output terminals when alternating current is supplied to said primary winding, means for preventing the passage of direct current through said primary winding, said input terminals being connected to supply direct current to said output terminals when direct current is supplied to said input terminals, the elements of said circuit being proportioned and arranged to deliver said alternating current to said output terminals at a predetermined step-up voltage ratio.

5. An electric circuit for transmitting direct current without appreciable attenuation and alternating current at a step-up voltage ratio, comprising a pair of input terminals for connection to a source of direct current or alternating current, a pair of output terminals for connection with apparatus adapted for using either direct or alternating current, an auto-transformer, a direct current blocking condenser connected in series with said transformer, said transformer and condenser being connected across said output terminals, one of said input terminals being connected to said auto-transformer intermediate the ends thereof and the other of said input terminals being connected with the side of said condenser remote from said transformer, the elements of said circuit being proportioned and arranged to deliver said alternating current to said output terminals at a predetermined step-up voltage ratio.

6. In a radio receiver adapted for using either direct or alternating current and including rectifying means, a power supply circuit comprising a pair of input terminals for connection to a source of direct current or alternating current, a pair of output terminals for connection with the rectifying means of said receiver, an inductance coil, a direct current blocking condenser connected in series with said coil, said coil and condenser being connected across said output terminals, one of said input terminals being connected to the side of said condenser remote from said coil and the other of said input terminals being connected to said coil at a point between the ends thereof providing between said point and said condenser a predetermined number of turns constituting an auto-transformer primary winding with all of the turns of said coil constituting the secondary winding thereof, the number of turns of said primary winding being so proportioned as to provide a predetermined step-up voltage ratio when alternating current is being supplied to said input terminals.

7. An electric transmission circuit comprising a transformer having a primary winding for connection with a supply circuit carrying either direct current or alternating current and a secondary winding for connection with a load circuit, impedance means connected in series with both said windings, having a high impedance to direct current and a low impedance to alternating current, a common terminal at one side of said impedance for said supply and load circuits, other terminals for interconnecting the said supply and load circuits by a direct current path through said transformer, and a rectifier interposed between said transformer and said load circuit.

8. An electric circuit for transmitting direct current without appreciable attenuation and alternating current at a step-up voltage ratio, comprising a pair of input terminals for connection to a source of direct current or alternating current, a plurality of output terminals for connection with a plurality of load circuits, a transformer including a primary winding having a terminal connected to an input terminal and a secondary winding having a plurality of electrically spaced terminals for connection with output terminals of said load circuits, said windings having a common terminal and means having a high impedance to direct current and a low impedance to alternating current interconnecting said common terminal with the other input terminal and another output terminal common to all of said load circuits, the elements of said circuit being proportioned and arranged to deliver said alternating current to said output terminals at a predetermined step-up voltage ratio.

9. An electric transmission circuit comprising a pair of input terminals for connection to a source of direct current or alternating current, a plurality of output terminals for connection with a plurality of load circuits, a transformer including a primary winding having a terminal connected to an input terminal and a secondary winding having a plurality of electrically spaced terminals for connection with output terminals of said load circuits, said windings having a common terminal, means having a high impedance to direct current and a low impedance to alternating current interconnecting said common terminals with the other input terminal and another output terminal common to all of said load circuits, and a rectifier interposed between each of said electrically spaced transformer terminals and the respective output terminals connected thereto.

WALTER LYONS.